US010674093B2

(12) United States Patent
Noda et al.

(10) Patent No.: US 10,674,093 B2
(45) Date of Patent: Jun. 2, 2020

(54) IMAGING DEVICE AND FLICKER DETERMINATION METHOD

(71) Applicant: Olympus Corporation, Hachioji-shi, Tokyo (JP)

(72) Inventors: Masatoshi Noda, Hachioji (JP); Takeshi Kindaichi, Hachioji (JP); Takashi Hamada, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/393,482

(22) Filed: Apr. 24, 2019

(65) Prior Publication Data

US 2019/0253604 A1   Aug. 15, 2019

Related U.S. Application Data

(63) Continuation of application No. PCT/JP2017/041557, filed on Nov. 17, 2017.

(30) Foreign Application Priority Data

Nov. 30, 2016   (JP) ................................. 2016-232669

(51) Int. Cl.
*H04N 5/235* (2006.01)
*H04N 5/345* (2011.01)
*H04N 5/357* (2011.01)
*H04N 5/353* (2011.01)
*H04N 5/232* (2006.01)

(52) U.S. Cl.
CPC ........... *H04N 5/2357* (2013.01); *H04N 5/235* (2013.01); *H04N 5/345* (2013.01); *H04N 5/357* (2013.01); *H04N 5/3532* (2013.01); *H04N 5/3535* (2013.01)

(58) Field of Classification Search
CPC ... H04N 5/2357; H04N 5/235; H04N 5/23245
See application file for complete search history.

(56) References Cited

U.S. PATENT DOCUMENTS

2015/0312459 A1*  10/2015  Nakagawara ........ H04N 5/2357
                                                                    348/228.1
2017/0366731 A1*  12/2017  Onodera ................ H04N 5/357

FOREIGN PATENT DOCUMENTS

JP           2013-089991         5/2013

* cited by examiner

*Primary Examiner* — Christopher K Peterson
(74) *Attorney, Agent, or Firm* — John C. Pokotylo; Pokotylo Patent Services

(57) ABSTRACT

An imaging device, comprising an image sensor, an imaging control circuit that controls an integration time of the image sensor, and a controller comprising a flicker component detection section that detects flicker components, and a flicker determination section that determines existence of flicker, wherein the flicker component detection section is provided with a plurality of detection regions in an imaging region of the image sensor along a scanning direction for an electronic shutter function, and detects flicker components from differences in brightness relating to the same detection region based on a plurality of imaging outputs that have been acquired by performing integrating at the same integration time with different frames, and the flicker determination section changes a determination value for determining the existence of flicker in accordance with an imaging mode, and performs determination by comparing the flicker component and the determination value.

8 Claims, 9 Drawing Sheets

FIG. 2A
|  | FOR LV | FOR MV |
|---|---|---|
| BRIGHTNESS VALUE THRESHOLD VALUE | Large (Th1) | Small (Th2) |
FIG. 2B
| STATE | FLAG FOR LV | FLAG FOR MV |
|---|---|---|
| BRIGHTNESS VALUE SATISFIES THRESHOLD VALUE FOR LV (LARGE) | 1 | 1 |
| BRIGHTNESS VALUE SATISFIES THRESHOLD VALUE FOR MV (SMALL) | 0 | 1 |
| BRIGHTNESS VALUE DOES NOT SATISFY EITHER THRESHOLD VALUE | 0 | 0 |
FIG. 2C
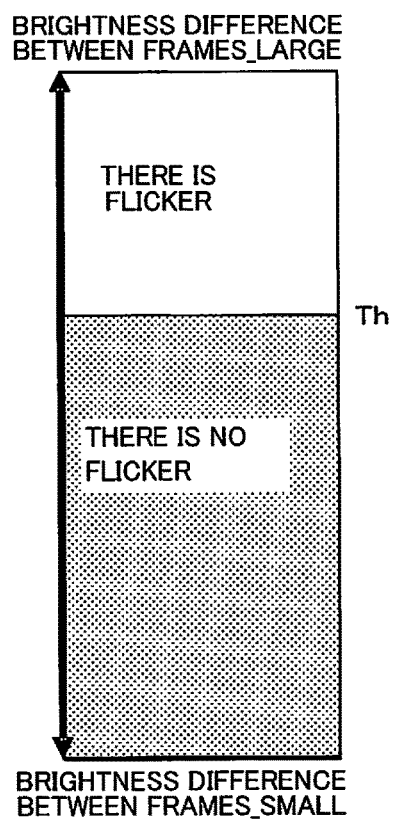
FIG. 2D
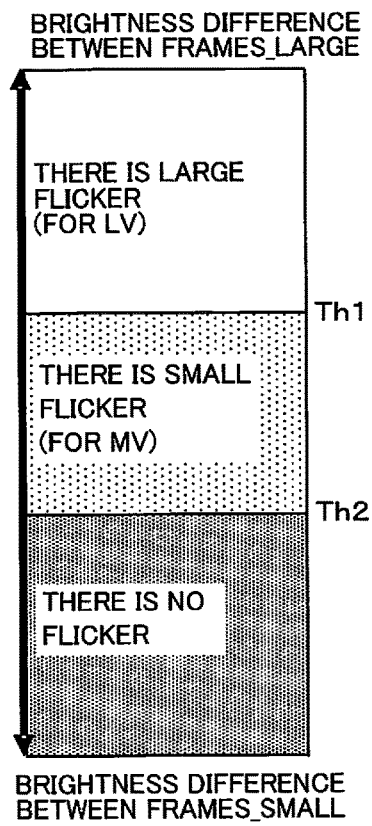

FIG. 4

|  | LIVEVIEW → MOVIE MODE | MOVIE MODE → LIVEVIEW |
|---|---|---|
| DETECTION RESULT (1,1) | CANCELLATION OPERATION | CANCELLATION OPERATION |
| DETECTION RESULT (0,1) | NO OPERATION | CANCELLATION OPERATION |
| DETECTION RESULT (0,0) | NO OPERATION | NO OPERATION |

IMAGING DEVICE AND FLICKER DETERMINATION METHOD

CROSS-REFERENCE TO RELATED APPLICATIONS

This application is a Continuation Application of PCT Application No. PCT/JP2017/041557, filed on Nov. 17, 2017 and based upon and claiming the benefit of priority from prior Japanese Patent Application No. 2016-232669, filed on Nov. 30, 2016, the entire contents of all of which are incorporated herein by reference.

BACKGROUND OF THE INVENTION

1. Field of the Invention

The present invention relates to an imaging device and a flicker determination method that, in a case where flicker is contained in a light source, are capable of determining the existence of this flicker.

2. Description of the Related Art

In a case where a subject that is has been lit by illumination light that repeatedly flickers has been taken by an image sensor, there may be cases where brightness differences arise in an image acquired by the image sensor depending on exposure time. A light source of illuminating light that repeatedly flickers is called a flicker light source, and there have been various proposals regarding detection methods for whether or not a light source that illuminates a subject is a flicker light source.

For example, in Japanese patent laid-open No. 2013-89991 (hereafter referred to as "patent publication 1") interval between streaks that are generated due to flicker, and movement amount between streak frames, are stored in advance, photometry information on photometry areas that have been multi-segmented is acquired, and it is determined whether an interval between streaks, that has been calculated based on this photometry information, and movement amount between streak frames, match conditions with a commercial power supply frequency that has been stored in advance (50 Hz/60 Hz). If this determination result is a match, it is determined that those streaks are flicker caused by a commercial power supply.

If it has been determined that flicker streaks are occurring, it is possible to cancel the flicker streaks by changing exposure control values. Cancelling of the flicker streaks is performed by lowering shutter speed. In this case, aperture is also reduced in order to achieve appropriate exposure. However, when performing auto focus (AF), AF is often performed with the aperture wide open in order to ensure AF precision, and responsiveness is lowered due to aperture drive at the time of flicker cancellation.

At the time of live view display, there is a still picture shooting standby state, and there is an emphasis on response from operating the release button until performing an imaging operation. It is therefore desirable to minimize reduction in response accompanying flicker cancellation processing. On the other hand, at the time of movie shooting, there is a concern that slight flicker streaks will also be recorded in image data, and it is preferable to prioritize a flicker cancellation operation from the viewpoint of image quality. Regarding this point, with conventional flicker cancellation technology there is no consideration given as to whether there are conditions to prioritize response at the time of shooting (for example, at the time of still picture shooting standby) or conditions to prioritize image quality improvement using flicker cancellation (for example, at the time of movie shooting), and flicker cancellation is performed for all conditions.

SUMMARY OF THE INVENTION

The present invention provides an imaging device and a flicker determination method that can perform determination as to whether or not to perform appropriate flicker cancellation depending on shooting conditions.

An imaging device of a first aspect of the present invention comprises: an image sensor having a rolling shutter type electronic shutter function, and having a plurality of imaging modes; an imaging control circuit that instructs performing of an imaging operation to the image sensor at a specified period, and controls an integration time of the image sensor; and a controller that comprises a flicker component detection section that detects flicker components based on imaging output of the image sensor, and a flicker determination section that determines the existence of flicker based on the flicker components that have been detected, wherein, the flicker component detection section is provided with a plurality of detection regions in an imaging region of the image sensor along a scanning direction for the electronic shutter function, and acquires imaging outputs by performing integrating at the same integration time with different frames, and detects flicker components from differences in brightness relating to the same detection region based on the plurality of imaging outputs that have been acquired; and the flicker determination section changes a determination value for determining the existence of flicker in accordance with the imaging mode, and determines the existence of flicker by comparing the flicker component and the determination value.

A flicker determination method of a second aspect of the present invention is a flicker determination method for an imaging device comprising an image sensor having a rolling shutter type electronic shutter function, and having a plurality of imaging modes, and an imaging control circuit that instructs performing of an imaging operation to the image sensor at a specified period, and controls an integration time of the image sensor, and comprises: detecting a flicker component based on imaging output of the image sensor; and determining existence of flicker based on the flicker component that has been detected, wherein, in the flicker determination method, further, in the flicker component detection, a plurality of detection regions are provided in an imaging region of the image sensor along a scanning direction for the electronic shutter function, and imaging output is acquired by performing integrating at the same integration time with different frames, and flicker component is detected from differences in brightness relating to the same detection region based on the plurality of imaging outputs that have been acquired; and in the determination of the existence of flicker, a determination value for determining the existence of flicker is changed in accordance with the imaging mode, and the existence of flicker is determined by comparing the flicker component and the determination value.

BRIEF DESCRIPTION OF THE DRAWINGS

FIG. 2A to FIG. 2D are tables showing a relationship between a brightness threshold and flags, in the camera of one embodiment of the present invention.

FIG. 4 is a table showing a relationship between shooting conditions and flicker cancellation operation corresponding to detection results, in the camera of one embodiment of the present invention.

DETAILED DESCRIPTION OF THE PREFERRED EMBODIMENTS

An example where a digital camera is adopted as one embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and shooting timing while observing the live view display. If a movie button or the like is operated, recording of image data for a movie is commenced, and if the movie button or the like is operated again recording of image data for a movie is finished. It is also possible to shoot still pictures by operating a release button. Image data for still pictures and movies that has been stored in a storage medium can be subjected to playback display on a display section if playback mode is selected.

Also, with the camera of this embodiment, when detecting flicker, a plurality of references are prepared for determining depth (amplitude) of flicker, and determining intensity of the flicker. Also, strength of a reference (threshold value) for determining flicker used when determining whether or not to execute flicker cancellation is changed in accordance with camera state (for example, still picture standby mode and movie mode). For example, in movie mode where image quality is prioritized determination uses a reference corresponding to weak flicker, and flicker cancellation is performed even if there is weak flicker. Also, in still picture shooting standby mode having response priority, determination uses a reference corresponding to strong flicker, and flicker cancellation is performed in the event that there is strong flicker.

Figure 1:
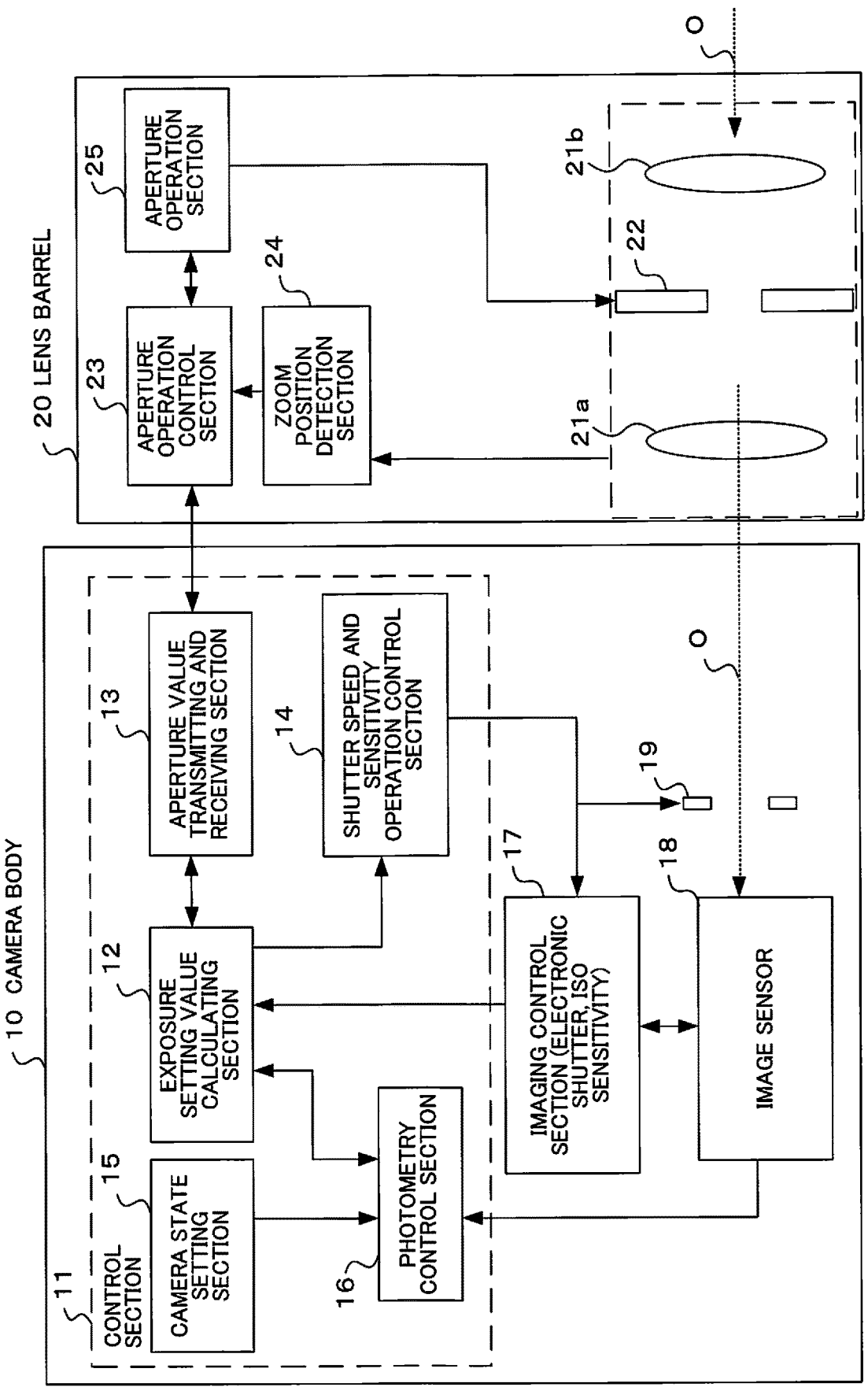
FIG. 1 is a block diagram mainly showing the electrical structure of a camera of one embodiment of the present invention.

FIG. 1 is a block diagram mainly showing the electrical structure of the camera of this embodiment. This camera has a camera body 10 and a lens barrel 20 that can be attached to the camera body 10. It should be noted that this embodiment is a so-called interchangeable lens type camera where the camera body 10 and the lens barrel 20 are formed separately. However, this is not limiting, and this embodiment may be a camera having a lens barrel formed integrally with the camera body.

A control section 11, imaging control section 17, image sensor 18, and mechanical shutter 19 are arranged within the camera body 10.

The mechanical shutter 19 is a so-called focal plane shutter or lens shutter, arranged to the front of the image sensor 18. This mechanical shutter 19 allows subject light flux from the lens barrel 20 to pass for a given exposure time (determined by shutter speed) at the time of still picture shooting. Also, at the time of movie shooting and at the time of live view display, the mechanical shutter 19 is in a wide-open state, and the imaging control section 17 controls exposure time using an electronic shutter. It should be noted that if the camera body 10 and the lens barrel 20 are integrally formed, the mechanical shutter 19 may also be a so-called lens shutter. Also, the mechanical shutter 19 may be omitted with only an electronic shutter using the image sensor 18.

The image sensor 18 is an image sensor such as a CCD image sensor or a CMOS image sensor, and is arranged on an extended line of the optical axis O of an optical system of the lens barrel 20. The image sensor 18 has a plurality of photoelectric conversion pixels, receives light of a subject image (optical image) that has been imaged by the lens barrel 20 on an imaging surface, subjects this subject image to photoelectric conversion using each of the photoelectric conversion pixels, generates a pixel signal, and outputs the pixel signal to the imaging control section 17. This image sensor 18 has a rolling shutter type electronic shutter function, and functions as an image sensor having a plurality of imaging modes. Also, the image sensor 18 has movie shooting mode and still picture shooting standby mode etc. as imaging modes.

The imaging control section 17 has an imaging control circuit, and performs readout control of a pixel signal from the image sensor 18 based on control signals from the control section 11. The imaging control section 17 can control exposure time (electronic shutter speed) at the plurality of photoelectric conversion pixels, by controlling the electronic shutter of the image sensor 18. The imaging control section 17 can also control ISO sensitivity by amplifying a pixel signal that has been read out from the plurality of photoelectric conversion pixels at a specified amplification factor. The imaging control section 17 functions as an imaging control circuit (imaging control section) that instructs performing of an imaging operation to the image sensor at a specified period, and controls an integration time of the image sensor.

The control section 11 includes a CPU (Central Processing Unit) and peripheral circuits such as an ASIC (Application Specific Integrated Circuit), and is a controller that performs control of the camera body 10 and the lens barrel 20. The CPU performs overall control of the camera in accordance with programs that have been stored in a non-volatile memory, such as flash memory. There are an exposure setting value calculation section 12, aperture value transmission and reception section 13, shutter speed and sensitivity operation control section 14, camera state setting section 15, and photometry control section 16 within the control section 11. The aperture value transmission and reception section 13 includes a communication circuit, and each section, such as the exposure setting value calculation section 12, is implemented as software using the CPU.

The camera state setting section 15 within the control section 11 detects operating states of operating members such as a power switch, release button, movie button, and touch panel etc., and sets camera state which is, for example, still picture shooting standby state, movie shooting state etc. based on the results of this detection.

The photometry control section 16 is input with camera states that have been set by the camera state setting section 15, a pixel signal from the image sensor 18, and exposure setting values that have been calculated by the exposure setting value calculation section 12, and determines whether or not there is a state where flicker will occur. Details of this determination method will be described later using FIG. 2A to FIG. 4. Flicker determination processing will also be described later using S13 in FIG. 5A and also FIG. 6.

A controller of the photometry control section 16 functions as a flicker component detection section that detects flicker components based on imaging output of the image sensor, and a flicker determination section that determines existence of flicker based on the flicker components that have been detected. The flicker component detection section is provided with a plurality of detection regions in an imaging region of the image sensor along a scanning direction for the electronic shutter function (refer, for example, to FIG. 3), acquires imaging outputs by performing integration at the same integration time with different frames, and detects flicker components from differences in brightness relating to the same detection region based on the plurality of imaging outputs that have been acquired (refer, for example, to FIG. 6). The flicker determination section changes a determination value for determining the existence of flicker in accordance with the imaging mode, and determines the existence of flicker by comparing the flicker component and the determination value.

Figure 6:
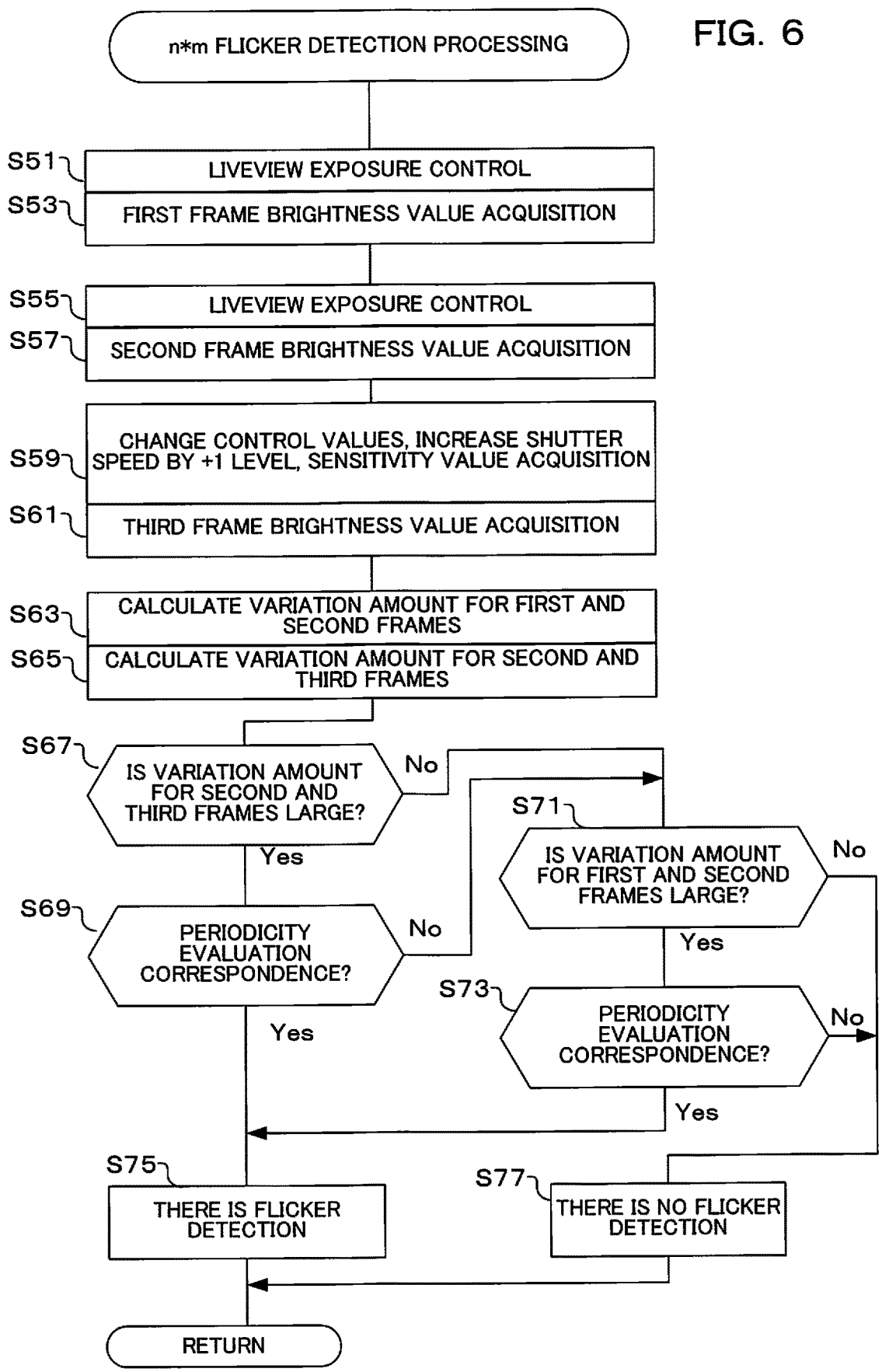
FIG. 6 is a flowchart showing operation of n*m flicker detection processing of the camera of one embodiment of the present invention.

Also, the flicker component detection section acquires imaging output by integrating at different integration times for different frames, and detects a second flicker component from a second brightness difference, which is a difference in brightness relating to the same detection region based on this plurality of imaging outputs that have been acquired (refer, for example, to S59, S61 and S65 in FIG. 6). Also, in still picture shooting standby mode, the flicker determination section performs determination using determination values corresponding to a flicker component that is larger than a determination value in the case of movie shooting mode (refer, for example, to Th1 in FIG. 2A and FIG. 2D).

The exposure setting value calculation section 12 within the control section 11 is input with a pixel signal from the imaging control section 17, and based on this pixel signal calculates aperture value, mechanical shutter speed, electronic shutter speed and ISO sensitivity etc. in order to achieve appropriate exposure from subject brightness. Also, in the case where a flicker determination result is input from the photometry control section 16 and flicker will arise, the exposure setting value calculation section 17 calculates electronic shutter speed and/or mechanical shutter speed so as to cancel the flicker. A controller of the exposure setting value calculation section 12 functions as a flicker removal section that removes the flicker component from imaging output of the image sensor, and the flicker component is removed by the flicker removal section if it is determined by the flicker determination section that flicker exists (refer, for example, to S27 in FIG. 5A and S35 in FIG. 5B).

An aperture value that has been calculated by the exposure setting value calculation section 12 is transmitted by means of the aperture value transmission and reception section 13 to the aperture operation control section 23 within the lens barrel 20. Also, shutter speed and sensitivity that have been calculated by the exposure setting value calculation section 12 are output to the shutter speed and sensitivity operation control section 14.

The aperture value transmission and reception section 13 has a communication circuit for transmitting and receiving between the camera body 10 and the lens barrel 20, and transmits an aperture value that has been calculated by the exposure setting value calculation section 12 at the camera body 10 side to the aperture operation control section 23 at the lens barrel 20 side. Also, in the event that the lens barrel 20 side aperture operation control section 23 has changed aperture value based on focal length (zoom encoder value) that has been detected by the zoom position detection section 24, the aperture value transmission and reception section 13 receives this changed aperture value.

The shutter speed and sensitivity operation control section 14 is input with electronic shutter speed and ISO sensitivity that have been calculated by the exposure setting value calculation section 12, and performs operation control so as to attain the input electronic shutter speed and ISO sensitivity. The shutter speed and sensitivity operation control section 14 also performs control of the mechanical shutter 19, at the time of still picture shooting, so as to attain a shutter speed that has been calculated by the exposure setting value calculation section 12. At the time of movie shooting and at the time of live view display, the mechanical shutter 19 is in a wide-open state.

A front lens group 21b, a rear lens group 21a, aperture 22, the aperture operation control section 23, a zoom position detection section 24, and aperture operation section 25, are provided within the lens barrel 20.

Subject light is incident from the subject side of the front lens group 21b (right side in the drawing). The front lens group 21b and the rear lens group 21a (when being described collectively, referred to as photographing lens 21 or photographing optical system) can allow a subject image to be formed on an imaging surface of the image sensor 18 by adjusting a focus lens within the photographing lens 21. It is also possible to change focal length by adjusting a zoom lens within the photographing lens 21.

The aperture 22 is arranged in the optical path of the photographing lens 21. The aperture 22 is capable of having opening diameter variably driven mechanically by the aperture operation section 25. By changing the opening diameter it is possible to change subject light amount that is incident on the image sensor 18.

The zoom position detection section 24 has a so-called zoom encoder, and detects position of a zoom lens within the photographing lens 21 for output to the aperture operation control section 23.

Next, an overview of the flicker determination of this embodiment will be described using FIG. 2A to FIG. 4. In detecting flicker, with a conventional method, as shown in FIG. 2C a brightness threshold value Th is provided, and determination is performed as to whether or not flicker will arise, in other words, two stage determination of "there is flicker" and "there is no flicker" is performed. Specifically, change in brightness between a plurality of frames for each area that has had angle of view split is observed, and whether or not flicker is occurring is determined based on movement amount and interval of flicker streaks. At this time, it is determined whether flicker streaks are detected based on whether or not a difference in brightness of areas between a plurality of frames is above a certain value.

With this embodiment, with reference to flicker detection there are a plurality of indicators of flicker brightness (amplitude, peak to peak, etc.), and intensity of flicker to be detected is determined. Specifically, by comparing differences in brightness between a plurality of frames with a threshold value, at the time of determination as to whether or not flicker streaks will arise, a plurality of threshold values (with this embodiment two values, large and small) are prepared, and strength of flicker is determined in a stepwise manner.

FIG. 2A shows an example where two values are provided as brightness difference threshold values, namely for live view (for LV), which is a shooting standby state, and for movie shooting (for MV). As will be understood from FIG. 2A and FIG. 2D, the brightness threshold value Th1 for live view (for LV) is made a large value so that flicker is determined if brightness difference is large, namely if flicker streaks appear strong. On the other hand, the brightness threshold value Th2 for movie shooting (for MV) is made a small value so that flicker is determined even if brightness difference is small, namely if flicker streaks appear weak.

This determination is performed for each corresponding area between a plurality of frames. If (n,m) are made area coordinates, difference values calculated at Bv [first frame] [n] [m]−Bv[second frame] [n] [m], Bv [first frame] [n] [m]−Bv[third frame] [n] [m], . . . , are respectively compared with the two threshold values shown in FIG. 2A.

FIG. 2B shows flags based on results of having performed determination for each of the areas described above. For example, in area (n, m), if brightness difference is larger than the threshold for LV, and larger than the threshold for MV, a flag determination result shows (1,1). Also, if a brightness difference is smaller than the threshold for LV but larger than the threshold for MV, the flag determination result shows (0,1). Also, if a brightness difference is smaller than the threshold for LV and smaller than the threshold for MV, the flag determination result shows (0,0).

Figure 3:
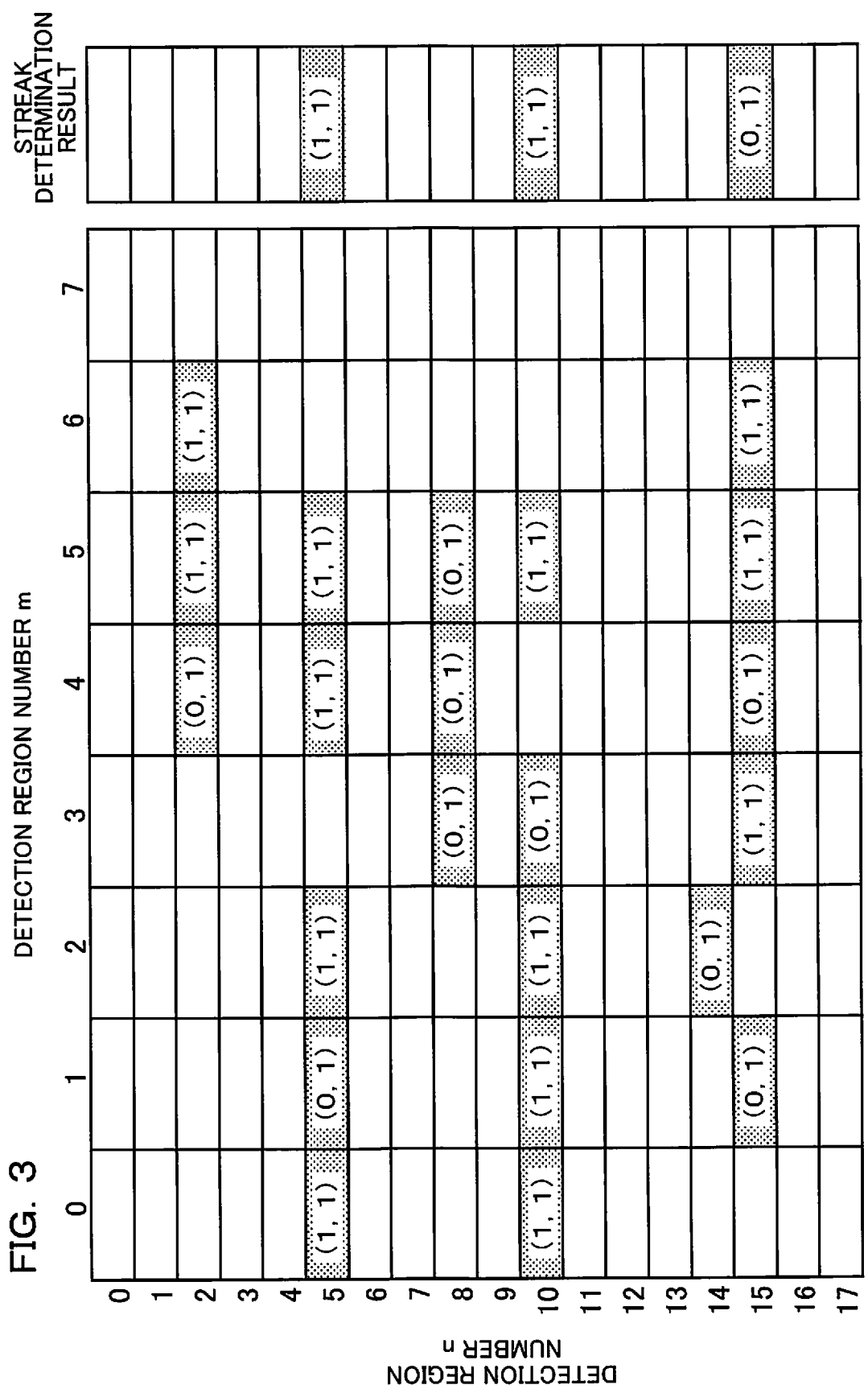
FIG. 3 is a table showing examples of determination results for each area of one frame, and streak determination results, in the camera of one embodiment of the present invention.

FIG. 3 is an example showing determination results of each area (detection region) for brightness differences for two frames. In the drawing, the n in the vertical direction and m in the horizontal direction represent area coordinate numbers, and (n, m) represents area positions. With this example, since one frame is divided into 18 in the vertical direction (column direction) and 8 in the horizontal direction (row direction), the number of areas is 144. With the example shown in FIG. 3, flag determination result for area (2,4) is (0,1), flag determination result for area (2,5) is (1,1), and flag determination result for area (2,6) is (1,1). It should be noted that in FIG. 3 description has been omitted for a flag determination result of (0,0).

As shown in FIG. 3, if flag determination is performed for every area, streak determination is performed for each row. With this example, if a summation result of flags for each row (horizontal direction) is 4 or more, it is determined that there is a streak. For example, looking at the fifth row, the flag for LV becoming 1 occurs in (5,0), (5,2), (5,4) and (5,5), and the flag for MV becoming 1 occurs in (5,0), (5,1), (5,2), (5,4) and (5,5). Accordingly, in the fifth row there are 4 or more of both flags, and so the streak determination result becomes (1,1). Also, looking at the 15th row, the flag for MV becomes 1 in 5 areas, but the flag for LV becomes 1 in only 3 areas. Accordingly, in the 15th row the streak determination result becomes (0,1).

The streak determination result shown in FIG. 3 is used when determining operation conditions for the flicker cancellation in accordance with camera conditions that have been set (still picture standby state, movie shooting state). Interval of respective streaks, namely strong flicker and weak flicker, and movement amount of streaks between frames is obtained in accordance with the streak determination result, to evaluate periodicity, and it is determined whether or not strong flicker and weak flicker are occurring. If there is a state where response to a release operation is prioritized, such as a still picture shooting standby state, then the flicker cancellation is not performed even if there is weak flicker, and flicker cancellation is performed based on determination that used strong flicker. On the other hand, if there is a state where image quality is prioritized, such as a movie shooting state, flicker cancellation is performed based on determination that used information with weak flicker. In a live view display state (still picture shooting standby), AF performance is prioritized and weak flicker is permitted, and performing flicker cancellation is prevented. However, if strong flicker occurs flicker cancellation is performed.

In this way, with this embodiment determination is performed by combining strength information of detected flicker and the camera state, and it is determined whether or not flicker cancellation will be performed. As a result of this control, it is possible to perform flicker cancellation that matches the aims of the required product.

Next, one example of the operation of this embodiment will be described using FIG. 4. Processing for flicker determination is executed in a camera state where display is successively updated, such as during live view display and at the time of movie shooting, and processing is continuously repeated for every frame or for every plurality of frames.

Streak determination is performed for every [n] line, as was described using FIG. 3. Based on this streak determination, it is determined that there is flicker if flicker frequency conditions are satisfied from streak interval and movement amount between flicker frames (refer to detections results (1,1), (0,1) of FIG. 4), and then the flicker intensity flags are also maintained. In the event that it has been determined that there is flicker, if the flag at this time is set, it remains set unless an operation to reset flicker detection processing itself is entered.

Also, during a flicker cancellation operation, cancellation processing is performed, and therefore flicker streaks themselves disappear, and flicker detection processing is then stopped. In the event that only a flag for MV is set (refer to detection result (0,1) in FIG. 4), the flicker detection processing is only stopped at the time of movie shooting. At the time of live view display, flicker cancellation processing is performed with weak flicker, which means that weak flicker streaks occur. However, with this case also, if strong flicker is observed, flicker detection continues so as to make it possible to perform flicker cancellation.

As shown in FIG. 4, there is transition between performing and not performing flicker cancellation processing in accordance with a detection result. A detection result of (1,1) is a case where both the flag for LV and the flag for MV have become 1. In this case, strong flicker occurs. If the detection result becomes (1,1), the flicker cancellation is performed under either condition, namely at the time of live view and at the time of movie shooting. Specifically, if the photometry control section 16 detects strong flicker (that is, a detection result of (1,1)), the exposure setting value calculation section 12 calculates shutter speed so as to cancel the flicker, and performs control on the basis of this calculation.

A detection result of (0,1) is a case where the flag for LV is 0 but the flag for MV is 1. In this case, weak flicker is occurring. In the case of a detection result of (0,1), flicker cancellation is not performed at the time of live view. This means that while a weak stripe pattern is superimposed on a live view image, AF response at the time of still picture shooting is good, and it becomes possible to take pictures without missing photo opportunities. Also, in the case where detection result is (0,1), flicker cancellation is performed at the time of movie shooting. This results in a high quality video image without a stripe pattern superimposed on a stored movie image.

A detection result of (0,0) is a case where both the flag for LV and the flag for MV are 0. In this case, neither strong or weak flicker are occurring, and flicker cancellation is not performed either at the time of live view display or at the time of movie shooting.

Figure 5A:
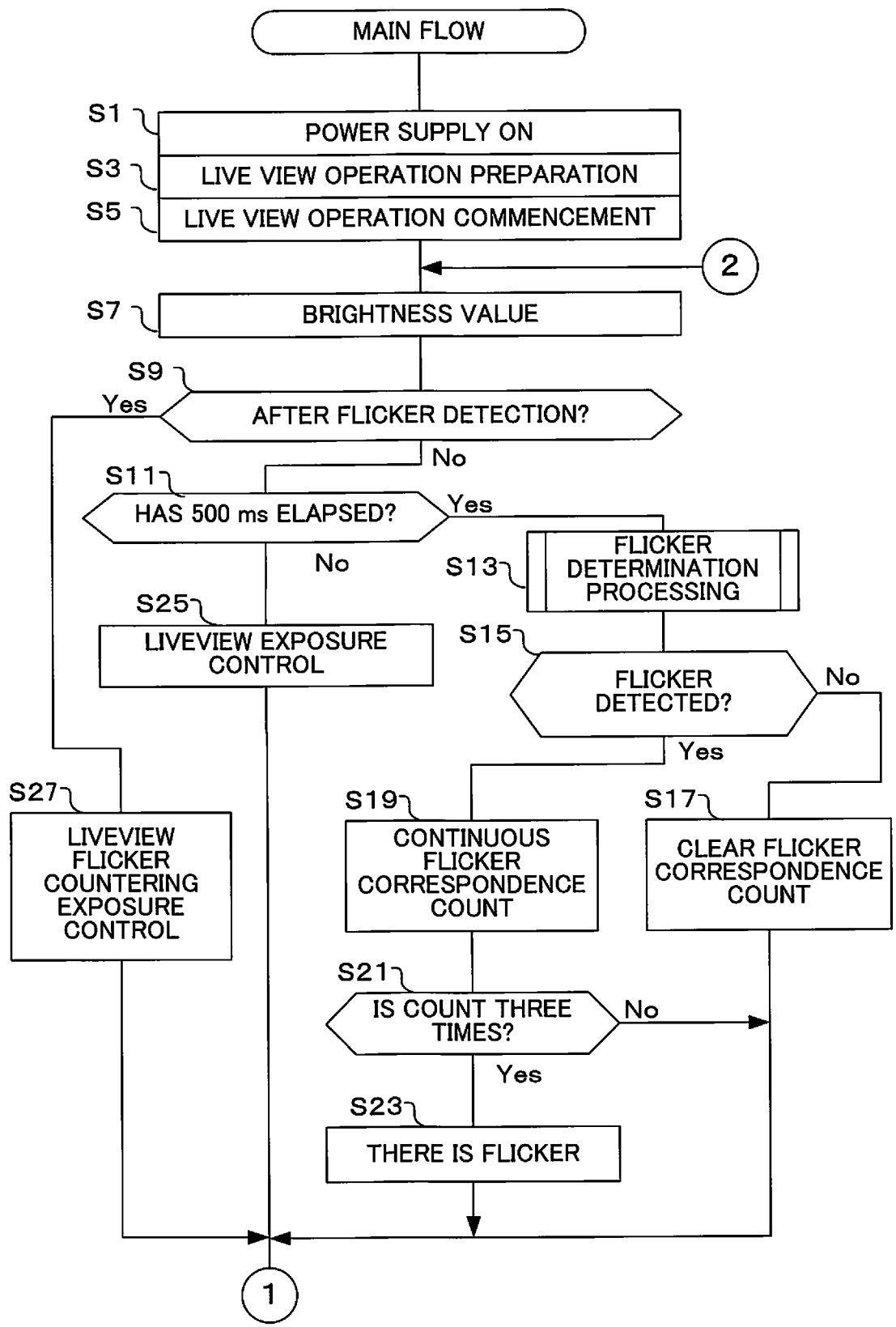
FIG. 5A and FIG. 5B are flowcharts showing main operation of the camera of one embodiment of the present invention.
Figure 5B:
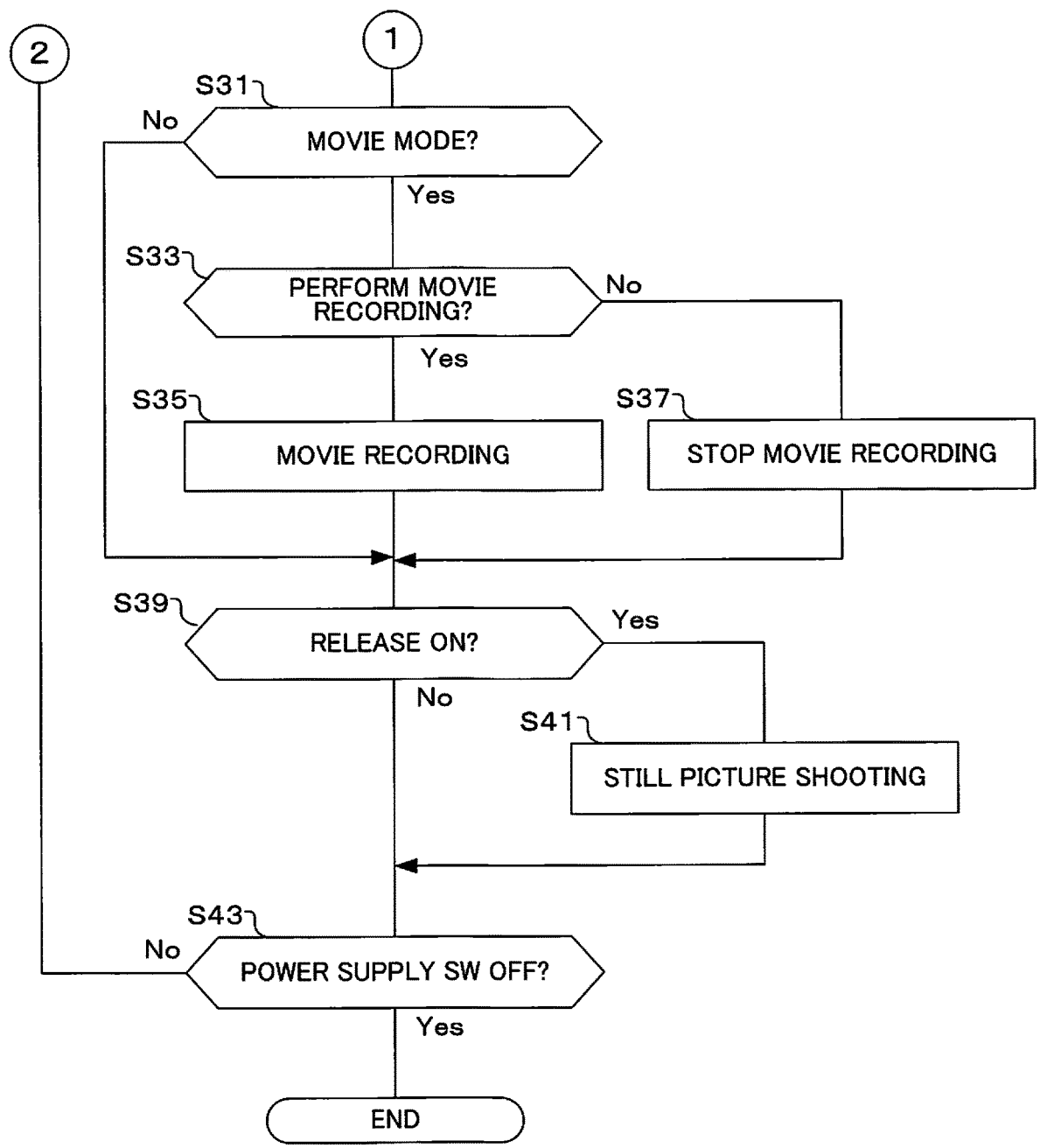

Next, main operation of this embodiment will be described using the flowcharts shown in FIG. 5A and FIG. 5B. This flow (the same also applies to the flowchart shown in FIG. 6, which will be described later) is executed by the CPU within the control section 11 executing control of each section in accordance with programs stored in memory.

If a power on operation is performed using an operation member such as a power switch, power supply on processing is performed (S1). Here, power supply on processing is performed at the time the power supply of the camera body 10 changes from off to on. This processing is generally called initialize processing, and is performed by activating circuits such as a CPU and respective circuits within the control section 11, circuits within the imaging control section 17, and the image sensor 18 etc., and supplying power and communicating with the lens barrel 20 that is connected to the camera body 10 etc. Also, various flags etc. of programs for the execution of the CPU are reset.

If power supply on processing has been performed, next live view operation preparation is performed (S3). Here, a specified aperture drive command is issued to the lens barrel 20 by means of the aperture value transmission and reception section 13. Also, setting of electronic shutter speed (integration time) and sensitivity is also performed to the imaging control section 17. The mechanical shutter 19 is also set to a wide open state using the shutter speed and sensitivity operation control section 14, and as a result the image sensor 18 receives light of a subject image.

If live view operation preparation has been performed, next the live view operation is commenced (S5). Here, the image sensor 18 performs an integration operation with the electronic shutter speed that has been set, and imaging output data is sent to an image processing IC (not illustrated) within the control section 11 by means of the imaging control section 17. Also, the imaging output data is subjected to the previously described flicker determination in the photometry control section 16, and exposure control values that have been output to the exposure setting value calculation section 12 are calculated. The image processing IC converts imaging output to image data and displays on a liquid crystal monitor (not illustrated), for a region designated by the detection region number n and the detection region number m shown in FIG. 3 (hereafter called "detection region").

Also, imaging output data that has been sent to the photometry control section 16 is data for subject brightness calculation, and this data may also include, for example, averaged data resulting from having divided an image that has been formed by the image sensor 18 into specified regions. There may also be data of pixel signals that are output by the image sensor 18, and this data is transmitted as numerical data such that it is possible to calculate brightness of a subject by the photometry control section 16.

Once the live view operation has been commenced, next a brightness value is acquired (S7). Here, the photometry control section 16 calculates a brightness value from data resulting from having region divided a subject image for each of the divided regions. The brightness value calculates to what extent light is irradiated to each region of the image sensor 18, using the image sensor 18, sensitivity that has been set, and aperture value and electronic shutter speed (same value as integration time of the image sensor 18) that have been controlled in the lens barrel 20.

Here, the area in which brightness is measured (photometric domain) is made a detection region shown in FIG. 3. With a rolling shutter type image sensor with which sequential integration commences from a row above (or below) photoelectric conversion pixels that have been arranged on the imaging surface of the image sensor 18, if photography is performed under a flicker light source a flicker component will appear as a stripe pattern. Accordingly, by measuring brightness by dividing in the vertical direction like detection regions, it is possible to investigate the period of stripes, which will be described later. It should be noted that the number of areas (photometric domains) in which brightness is measured is not limited to the number of divisions representing brightness regions.

If a brightness value has been acquired, it is next determined whether or not it is after flicker detection (S9). In step S23, which will be described later, in the event that flicker has been detected, that fact (setting the flag for LV or flag for MV to 1) is stored. In this step determination is based on whether or not this storage has been performed. If the result of determination in this step S9 is that flicker has not been detected, there is a transfer of control to step S11. On the other hand, if flicker has been detected, there is a transfer of control to step S27. In the event that the determination of step S9 is performed for the first time after commencement of the power supply on processing of step S1, it is determined that flicker is not detected.

If the result of determination in step S9 is that it has been determined that it is not after flicker has been detected, it is determined whether or not 500 ms has elapsed (S11). Here, determination as to whether an elapsed time from immediately after a power supply has been turned on, or a flicker detection period td (for example, td=500 ms) after the previous elapse of step S11, has elapsed, is performed. This flicker detection period td is for controlling the time at which to perform flicker detection. It should be noted that 500 ms is just an example, and may be determined in accordance with the flicker detection period.

If the result of determination in step S11 is that 500 ms has not elapsed, live view (movie) exposure control is performed (S25). Here, aperture value, shutter speed and sensitivity are calculated so that exposure level based on brightness value that was acquired in step S7 is achieved. By setting these values that have been calculated as the aperture 22 of the lens barrel 20, electronic shutter speed of the image sensor 18, and sensitivity, it is possible to obtain imaging output of an appropriate exposure level. The exposure control of step S25 is processing that is executed in the event that flicker is occurring, and so, differing from the exposure control of step S27, which will be described later, there is no control relating to shutter speed.

If the result of determination in step S11 is that 500 ms has elapsed, flicker determination processing is performed (S13). Here, the flicker determination that was described using FIG. 2A to FIG. 4, namely whether strong flicker is occurring or weak flicker is occurring, is detected, and further, based on this result it is determined whether or not flicker is occurring. Detailed operation of this flicker determination processing will be described later using FIG. 6.

If flicker determination processing has been performed, it is determined whether or not flicker has been detected (S15). Here, determination is based on the result of the processing in step S13.

If the result of determination in step S15 is that flicker is not detected, flicker correspondence count is cleared (S17). Here, with the processing that is performed in the event that it has not been determined that there is a flicker light source in step S13, a counter that counts how many times a flicker light source has been determined continuously in a period of 500 ms or more is cleared.

On the other hand, if the result of determination in step S15 is that flicker has been detected, a count is performed corresponding to continuous flicker (S19). Here, a counter for counting a number of times a flicker light source has been determined continuously in a period of 500 ms more is incremented by +1.

It is then determined whether or not the count is greater than 3 (S21). Here, it is confirmed whether or not a counter for counting the number of times that a flicker light source has been determined continuously in a period of 500 ms or more is "3".

If the result of determination in step S21 is that the count is 3 times, it is determined that there is flicker (S23). If the results of determination of step S21 is Yes, then since flicker has been detected continuously three times, it is determined that the subject is under a flicker light source. Specifically, a flicker detection operation is performed at intervals of 500 ms or more by this series of processes of steps S11, S13, S15, S19, S21 and S23, and flicker has been detected continuously 3 times, and so processing is performed to determine that the subject is under a flicker light source. Generally, an environment of a subject, such as being subjected to or not subjected to a flicker light source environment, does not change at a level of seconds, and so determination of flicker is performed for a time of about 1.5 seconds, and if flicker has been detected for the entire duration of the 1.5 seconds then flicker is determined. In step S23, the flag for LV or flag for MV is set to 1 in accordance with strength of flicker. It should be noted that "3" is not limiting, as long as it is a number of time with which it can be determined that there is flicker.

Exposure control with flicker countermeasure is performed in a case where a subject crosses a flicker light source for an instant, that will be described later in step S27, and flicker countering exposure control is also performed when there is a subject in a flicker light source environment for a prolonged time.

Returning to step S9, if the result of this determination is after flicker detection, live view (movie) flicker countering exposure control is performed (S27). Here, if the subject is under a flicker light source, flicker countering exposure control that reduces the effect of flicker is executed. With flicker countering exposure control integration time is made shorter than the flicker period, and electronic shutter speed is set to an integration time that is a multiple of the flicker period.

Since electronic shutter speed it set faster for the purpose of flicker cancellation, the aperture 22 of the lens barrel 20 is controlled. Specifically, light amount that reaches the image sensor 18 is restricted, so that there is not over exposure even if the integration time is made a multiple of the flicker period. However, aperture drive in order to change the aperture value is performed by driving a mechanical mechanism, which means that followability is slow compared to control for electronic shutter speed change or sensitivity change, and so aperture control is not preferred during a live view operation or during movie recording.

Also, the fact that handling change in brightness of the subject is dealt with using aperture value without using a shutter speed that is shorter than the frame period means that response of tracking brightness change is made slow, and is not preferred as live view display used for compositional confirmation for still picture shooting to catch a fleeting moment.

Further, depth of field is made deeper by closing down the aperture, making it difficult for the user to confirm an in focus state, and at the time of autofocus a depth of field for confirming focus precision is required to be shallow which means that is a frequent disadvantage that release time lag, that is required to place the aperture in a wide open state every time autofocus is performed, becomes long.

For this reason, during a live view operation it is preferable to make the aperture wide open, and to perform brightness tracking with the electronic shutter and sensitivity of the image sensor 18. Accordingly, with this embodiment the above described flicker countering exposure control is made control performed when it has been determined that the subject is under a flicker light source. On the other hand, during movie recording there may be cases where the user has set the aperture value, and the aperture is not necessarily wide-open.

If live view (movie) flicker countering exposure control has been performed in step S27, or if live view (movie) exposure control has been performed in step S25, or if it has been set that there is flicker in step S23, or if the result of determination in step S21 is that the count is not three times, or if the flicker correspondence count has been cleared in step S17, it is next determined whether or not it is movie mode (S31). Here, determination is based on the setting in the camera state setting section 15. If the photographer is intending to perform movie shooting, movie mode will be set.

If the result of determination in step S31 is movie mode, it is determined whether or not to perform movie recording (S33). In a movie mode setting state, in the event that the photographer intends to perform movie recording the movie button is operated, and a movie recording instruction is issued. If the result of determination in step S33 is to record a movie, movie recording is performed (S35). Here, if the fact that there is flicker (flag for MV=1) was stored in step S23, image data of a movie to which flicker cancellation processing has been applied is stored. As flicker cancellation processing, for example, processing is performed such as removing flicker streaks by combining a plurality of frames before and after different flicker streak positions. On the other hand, if the result of determination is not movie recording, movie recording is stopped (S37).

If movie recording has been performed in step S35, or if halting of movie recording has been performed in step S37, or if the result of determination in step S31 is not movie mode, it is determined whether or not release is on (S39). Here it is determined by the camera state setting section 15 whether or not a release operation has been performed using the release button.

If the result of determination in step S39 is release on, still picture shooting is performed (S41). Here, a live view operation is temporarily halted, and optimum aperture value, mechanical shutter speed, and sensitivity for still picture shooting are calculated from a brightness value obtained in step S7. It should be noted that in a case where the mechanical shutter 19 is not provided, electronic shutter speed is calculated instead of mechanical shutter speed. A still picture shooting operation is performed from the values that have been calculated. It should be noted that even if movie recording is in progress, still picture shooting is possible.

If still picture shooting has been performed in step S41, or if the result of determination in step S39 is not release on, it is determined whether or not a power supply switch (SW) is off (S43). Here it is determined whether the power supply switch has been turned off. Then, in the event that the power supply switch has not been turned off, step S9 is returned to in order to perform an exposure operation for the next frame, and processing to acquire brightness value is performed.

As long as the power supply switch has not been turned off, processing from step S7 to step S41 is performed repeatedly. Also, in the event that the release switch has been turned off, processing from step S7 to step S27 is performed repeatedly. While this processing is being repeatedly performed, a live view operation for displaying continuous images is performed to the liquid crystal monitor. If the power supply switch has been turned off, camera power supply off control is performed.

Next, flicker determination processing in step S13 will be described using the flowchart shown in FIG. 6. With reference to FIG. 6, one example of flicker detection processing of step S13 described above shown in "n*m flicker detection processing" of the flow will be described in detail.

As an overview of control for this n*m flicker detection processing, a brightness value for a frame of three continuous frames is acquired from imaging output that is repeated at a specified period, based on brightness value that was acquired in step S7. In brightness value acquisition, processing is performed with the same shutter speed for the first frame and second frame, and for the third frame control is performed to change shutter speed until an exposure level is maintained, by making shutter speed one level faster than for the first and second frames, as well as increasing sensitivity by one level. Flicker determination is performed using brightness value that has been acquired with the first to third frames.

If the flow for the n*m flicker detection processing is entered, first, live view exposure control is performed (S51). Here, aperture value, shutter speed and sensitivity are calculated so that exposure level based on brightness value that was acquired in step S7 (refer to FIG. 5A) is achieved. Then, an imaging operation is performed by setting each of the values that has been calculated as the lens aperture, electronic shutter of the image sensor 18, and sensitivity, and imaging output is acquired.

If liveview exposure control has been performed, next brightness value of a first frame is acquired (S53). Here, similarly to step S7, brightness values for each region within a detection region shown in FIG. 3 are acquired based on imaging output that was acquired for the first frame.

If brightness values for the first frame have been acquired, next live view exposure control is performed (S55). Here, an imaging operation is performed with the same aperture value, shutter speed, and sensitivity as in step S51, and imaging output for the second frame is acquired. If live view exposure has been performed for the second frame, brightness values for the second frame are required (S57). Here, brightness values for each region within the detection region shown in FIG. 3 are calculated based on imaging output for the second frame.

If brightness values have been acquired for the second frame, change of exposure control values is performed to increase the shutter speed by one level faster, and increased sensitivity by one level (S59). Here, among the aperture value, shutter speed and sensitivity that were controlled in step S53, the shutter speed is made faster by one level. Sensitivity is increased by one level so that under exposure does not occur as a result of making the shutter speed one level faster.

If change of control values for the third frame has been performed, brightness values for the third frame are acquired (S61). Here, an imaging operation is performed for the third frame, and imaging output is acquired. When acquiring brightness values, similarly to the first and second frames, brightness values are calculated for each region within a detection region shown in FIG. 3.

If brightness values for the third frame have been acquired, next calculation of variation amount for the first and second frames is performed (S63). Here, for brightness values of each region that have been acquired with the first frame and the second frame, a difference in brightness value is calculated for every corresponding region. In order to calculate a difference in brightness value between two frames in region N, with the example shown in FIG. 3, for a case of N=1 to 17, calculation of equation (1) below is respectively performed.

$$D12 = Bv2 - Bv1 \quad (1)$$

Here, D12 is a region N difference (variation amount between first and second frames), Bv2 is brightness value of region N for the second frame, and Bv1 is brightness value of region N for the first frame.

If calculation of variation amount for the first and second frames has been performed, next calculation of variation amount for the second and third frames is performed (S65). Here, for brightness values of each region that have been acquired with the second frame and the third frame, a difference in brightness value (variation amount) is calculated for every corresponding region. In order to calculate a difference in brightness value between two frames in region N, for a case of N=1 to 17, calculation of equation (2) below is respectively performed.

$$D23 = Bv3 - Bv2 \quad (2)$$

Here, D23 is a region N difference (variation amount between second and third frames), Bv3 is brightness value of region N for the third frame, and Bv2 is brightness value of region N for the second frame.

As a result of the processing so far, imaging output, which is imaging output required for flicker determination, of two frames is acquired with the same integration time, and imaging output of two frames is acquired for different integration times. Further, brightness within a detection region shown in FIG. 3 is calculated from this imaging output, and brightness change for two frames of the same integration time and brightness change for two frames of different integration times are acquired for every region from calculations of equation (1) and equation (2).

Figure 7:
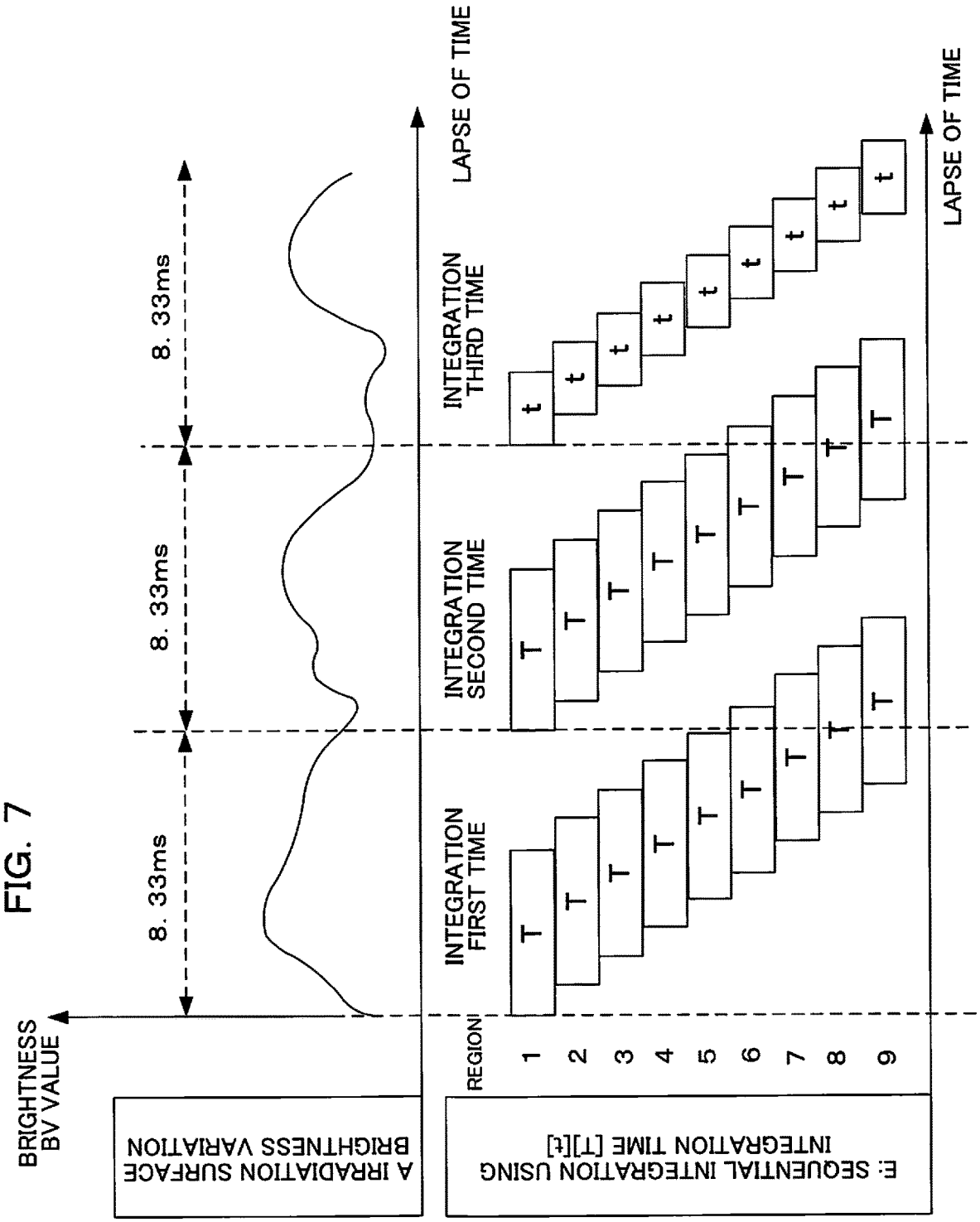
FIG. 7 is a drawing showing one example of a relationship between integration time and brightness value for a subject that moves under a flicker light source, in the camera of one embodiment of the present invention.

Here, brightness variation accompanying flicker will be described using FIG. 7 and FIG. 8. The description "A: irradiation surface brightness variation" in the graph shown in FIG. 7 is a light source having a commercial power supply frequency of 60 Hz and a flicker frequency of 120 Hz, and shows a state where a component that changes brightness at a period of 8.33 ms due to the flicker, and a brightness component that changes due to random movement of the subject, are superimposed. There may also be cases where the imaging output frame rate is 120 fps, and the flicker frequency and the imaging output frame rate are synchronized.

Also, the description "E: iterated integral using integration time "T" "t"" in the graph of FIG. 7 shows integration timing using a given integration time of each region shown in the detection region shown in FIG. 3. The first integration and the second integration are set to the same integration time, and the integration time for the third integration is made shorter. This is the state that was described from step S51 to step S61 in FIG. 6, and corresponds to the first frame being first integration, the second frame being second integration and the third frame being third integration. It should be noted that with FIG. 7 (the same also applies to FIG. 8, and FIG. 9, which will be described later) all detection regions are shown simplified to N=1-9.

Figure 8:
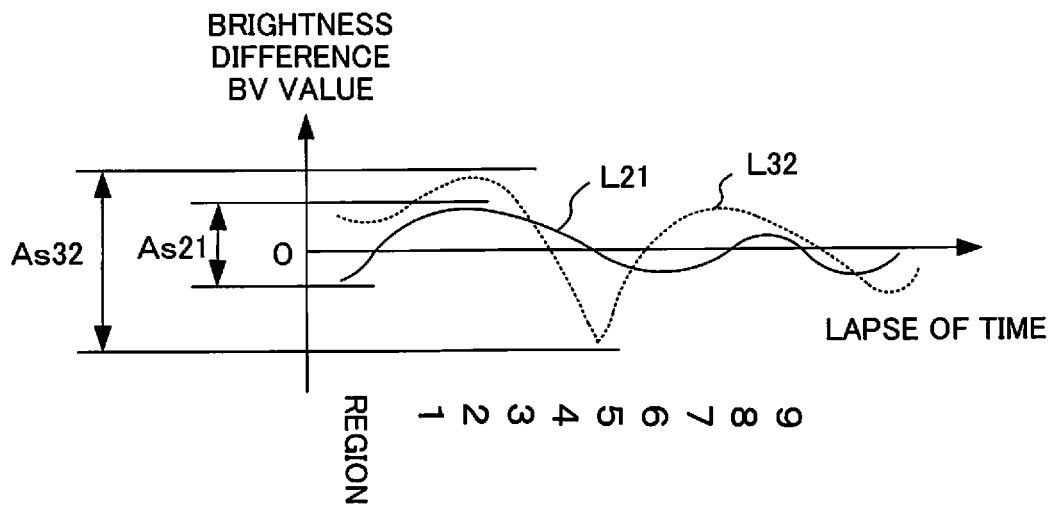
FIG. 8 is a drawing showing one example of a change, over time, of a difference between brightness values for the same integration time and different integration times, for a subject that moves under a flicker light source, in the camera of one embodiment of the present invention.

FIG. 8 shows change over time of variation amounts for the first and second frames that were acquired in step S63, and variation amounts for the second and third frames that were acquired in step S65. Solid line L21 shows "2nd frame−1st frame", which is variation amount for the first and second frames, and here is a difference (region N difference) in brightness values for the second frame and the first frame for which an imaging operation was performed with the same integration time. Dashed line L32 shows "3rd frame−2nd frame", which is variation amount for the second and third frames, and here is a difference (region N difference 2) in brightness values for the third frame and the second frame for which an imaging operation was performed with different integration times.

In previously described step S65, an amplitude As32 shown in FIG. 8, namely "amplitude of 3rd frame−2nd frame", which is a difference between maximum value and minimum value of "3rd frame−2nd frame", is calculated. Also, in previously described step S63, similarly, an amplitude As21, namely "amplitude of 2nd frame−1st frame", which is a difference between maximum value and minimum value of "2nd frame−1st frame", is calculated.

Returning to the flowchart shown in FIG. 6, if variation amounts have been calculated in steps S63 and S65, it is next determined whether or not variation amount for the second and third frames is large (S67). Here, whether or not "3rd frame−2nd frame amplitude" that was obtained in step S65 is sufficiently larger than "2nd frame−1st frame amplitude" that was obtained in step S63, is compared. If the result of this comparison is that it is determined that the difference is sufficiently large, it is determined to correspond to one condition for flicker determination. Specifically, if equation (3) below is satisfied, it is determined to correspond to one condition among flicker determinations.

$$AW32/AW21 > Thd \quad (3)$$

Here, AW32 is "amplitude of 3rd frame−2nd frame", AW21 is "amplitude of 2nd frame−1st frame", and ThD is threshold value D.

For example, in a case where, in step S67, variation amount (amplitude) of a detection region that was detected in step S65 is two times larger compared to the variation amount (amplitude) that was obtained in step S63 (for example, threshold value ThD=2 in equation (3)), in that detection region the previously described flicker generation flag determination, and flag setting (flag for LV or flag for MV setting), are performed. Streak determination result for each line is then obtained based on flag determination result for every detection region. Further, based on the streak determination result for each line, periodicity evaluation is performed based on streak interval etc., and if it is determined by performing determination of flicker generation relating to the whole of this frame that flicker has occurred, it is determined that the subject is under a flicker light source of a flicker frequency of 60 Hz (S67 Yes), and processing advances to step S69.

On the other hand, if a ratio of variation amount for a particular detection region is two times or more, flag setting to the effect that there is no flicker generation in that detection region is performed. Streak determination result for each line is then obtained based on flag determination result for every detection region. Further, based on streak determination result for each line, if it is determined that there is no flicker generation by performed determination of flicker generation relating to the whole of this frame, it is determined that the subject is under a flicker light source having a flicker frequency of 60 Hz, or that the effect of the flicker light source is sufficiently small, and processing advances to step S71 (S67: No). It should be noted that threshold value ThD corresponds to the previously described brightness difference threshold value. As the threshold value ThD, there are a threshold value for live view (for LV) and a threshold value for movie shooting (for MV), and setting of flags for whether or not there is flicker generation (flag for LV, flag for MV) is performed using these respective threshold values for every detection region.

If the result of determination in step S67 is that variation amount for the second and third frames is large, it is determined whether or not it corresponds to a periodicity evaluation (S69). Here, the period of the brightness variation is examined, whether or not this period is synchronized to the flicker period is examined, and is determined whether the periodicity corresponds to the flicker period.

Figure 9:
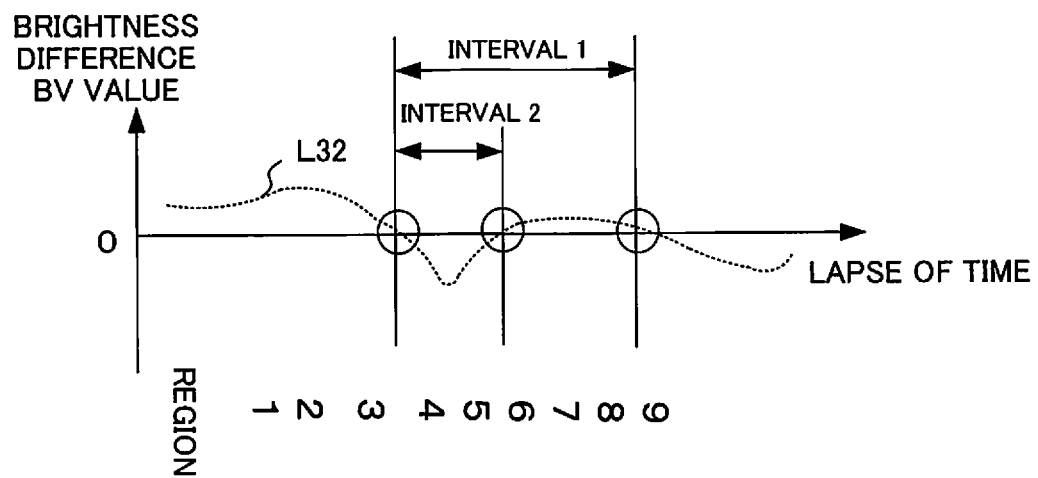
FIG. 9 is a drawing showing one example of a change, over time, of a difference between brightness values for different integration times, in the camera of one embodiment of the present invention.

Determination as to whether or not periodicity corresponds to flicker period will be described using FIG. 9. In FIG. 9, dashed line L32 represents a difference between the third frame and the second frame, and for this difference between the third frame of the second frame a switching point for switching from positive to negative is investigated. Brightness values of "region N" and "region N+1" are compared, and an N where the brightness value for "region N" becomes positive, and the brightness value for "region N+1" becomes negative or zero, is searched for. It is determined whether an interval 1 shown in FIG. 9, which is an interval between a plurality of such switching points when the subject is under a flicker light source, corresponds to the time of a single period of flicker.

Similarly, by comparing "region N" and "region N+1", switching points for switching from negative to positive are also obtained, and with the example shown in FIG. 9 three switching points are obtained. Whether or not flicker is occurring can be investigated with a method that, for example, determines whether or not interval 2 is substantially half of the flicker period. In cases where the time for acquiring imaging output for one screen is a number of times longer than the flicker period and streaks therefore often occur on live view, methods of investigating frequency components, such as increasing the number of region beyond 9, and Fourier transform etc., are also effective.

In this way, if the result of determination in step S73 is that a variation period for brightness value is substantially the same as the flicker period, and corresponds to flicker period as periodicity evaluation, processing advances to step S75. Also, if the result of determination in step S69 is that periodicity evaluation is matched, processing advances to step S75. In step S75, determination that flicker has been detected is stored (S75).

On the other hand, in step S71 it is determined whether or not variation amount for the first and second frames is large. Here, it is determined whether or not AW21 ("amplitude of 2nd frame−1st frame") that was acquired in step S63 is larger than a specified threshold value. Then, if AW21 ("amplitude of 2nd frame−1st frame") is larger than the specified threshold value it is determined that variation amount for the first and second frames is large and processing advances to step S73. In step S73 change over time of region N difference (amount of brightness variation for the first and second frames) is checked, and it is determined whether or not that periodicity matches a flicker component for a flicker frequency of 100 Hz. Then, if the result of periodicity evaluation is that the periodicity corresponds to a flicker component, it is determined to correspond to periodicity evaluation, and in step S75 (there is flicker detection) determination that flicker has been detected is stored. If the result of determination in step S71 is that variation amount for the first and second frames is not large, or if the result of determination in step S73 is that the periodicity does not correspond to the flicker period, determination that there is not flicker detection is stored (S77).

Once whether or not there is flicker detection has been stored in step S75 or S77, this flow is terminated and the originating flow is returned to.

As has been described above, with the one embodiment of the present invention, a flicker component is detected based on imaging output of an image sensor (refer, for example, to S13 in FIG. 5A, S51 to S65 in FIG. 6), and the existence of flicker is determined based on the flicker component (refer, for example, to S67 to S75 in FIG. 6). Also, with flicker component detection a plurality of detection regions are provided in an imaging region of the image sensor along a scanning direction for the electronic shutter function (refer, for example, to [n] lines in FIG. 3), and flicker components are detected based on differences in brightness relating to the same detection region of a plurality of imaging outputs that have been acquired by performing integration at the same integration time with different frames (refer, for example, to S51 to S65 in FIG. 6). Also, determination value for determining the existence of flicker is changed in accordance with imaging mode, and determination is performed by comparing a flicker component with a determination value (refer, for example, to FIG. 2A to FIG. 4). This means that it is possible to perform determination as to whether or not appropriate flicker cancellation will be performed in accordance with imaging conditions (imaging mode).

Also, with the one embodiment of the present invention, flicker determination processing is mainly realized in software by a CPU performing processing in accordance with programs (refer to FIG. 6). However, implementation is not limited to software, and some or all sections may be realized by hardware.

Also, with the one embodiment of the present invention, as a plurality of imaging modes, description has been given for a case where movie shooting mode and still picture shooting standby mode are provided. However, this is not limiting, and there may be other imaging modes, such as enlarged imaging mode that is appropriate for enlarged display of an image etc., and an external output imaging mode that is suitable for display of an image on an external monitor etc.

Also, with the one embodiment of the present invention the exposure setting value calculation section 12, aperture value transmission and reception section 13, shutter speed and sensitivity operation control section 14, camera state setting section 15, and photometry control section 16 are configured inside the control section 11, with sections being executed in software using the CPU, and sections being configured using hardware. However, this is not limiting, and those sections may be configured separately to the control section 11. It is also possible to have a hardware structure such as gate circuits that have been generated based on a programming language that is described using Verilog, and also to use a hardware structure that utilizes software such as a DSP (digital signal processor). Suitable combinations of these approaches may also be used. Also, some functions of the CPU may be implemented by circuits that are executed by program code such as a DSP, may use a hardware structure such as gate circuits that are generated based on a programming language described using Verilog, or may be executed using hardware circuits.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a microscope, a camera for mounting on a vehicle, a surveillance camera etc. In any event, it is possible to adopt the present invention as long as a device is for shooting where there is a possibility of flicker occurring.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an image sensor having a rolling shutter type electronic shutter function, and having a plurality of imaging modes;
an imaging control circuit that instructs performing of an imaging operation to the image sensor at a specified period, and controls an integration time of the image sensor, and
a controller comprising a flicker component detection section that detects flicker components based on imaging output of the image sensor, and a flicker determination section that determines existence of flicker based on the flicker components that have been detected, wherein,
the flicker component detection section is provided with a plurality of detection regions in an imaging region of the image sensor along a scanning direction for the electronic shutter function, and acquires imaging outputs by performing integrating at the same integration time with different frames, and detects flicker components from differences in brightness relating to the same detection region based on the plurality of imaging outputs that have been acquired; and
the flicker determination section changes a determination value for determining the existence of flicker in accordance with the imaging mode, and determines the existence of flicker by comparing the flicker component and the determination value.

2. The imaging device of claim 1, wherein:
the flicker component detection section acquires imaging output by integrating at different integration times for different frames, and detects a second flicker component from a second brightness difference, which is a difference in brightness relating to the same detection region based on this plurality of imaging outputs that have been acquired.

3. The imaging device of claim 1, wherein:
the imaging modes include movie shooting mode and still picture shooting standby mode, and
the flicker determination section, in the still picture shooting standby mode, performs determination with a determination value that is larger than in the case of movie shooting mode.

4. The imaging device of claim 1, wherein:
the controller further comprises a flicker removal section that removes the flicker component from the imaging output of the image sensor, and
if it has been determined by the flicker determination section that flicker exists, the flicker component is removed by the flicker removal section.

5. A flicker determination method, for an imaging device comprising an image sensor having a rolling shutter type electronic shutter function, and having a plurality of imaging modes, and an imaging control circuit that instructs performing of an imaging operation to the image sensor at a specified period, and controls an integration time of the image sensor, comprising:
detecting flicker components based on imaging output of the image sensor; and
determining existence of flicker based on the flicker component that has been detected,
wherein, in the flicker determination method, further
in the flicker component detection, a plurality of detection regions are provided in an imaging region of the image sensor along a scanning direction for the electronic shutter function, and imaging output is acquired by performing integrating at the same integration time with different frames, and flicker component is detected from differences in brightness relating to the same detection region based on the plurality of imaging outputs that have been acquired; and
in the determination of the existence of flicker, a determination value for determining the existence of flicker is changed in accordance with the imaging mode, and the existence of flicker is determined by comparing the flicker component and the determination value.

6. The flicker determination method of claim 5, wherein:
in the flicker component detection, imaging output is acquired by integrating at different integration times for different frames, and detecting a second flicker component from a second brightness difference, which is a difference in brightness relating to the same detection region based on this plurality of imaging outputs that have been acquired.

7. The flicker determination method of claim 5, wherein:
the imaging modes include movie shooting mode and still picture shooting standby mode, and
in the flicker determination, in the still picture shooting standby mode, determination is performed with a determination value that is larger than in the case of movie shooting mode.

8. The flicker determination method of claim 5, wherein:
if the result of determination of the existence of flicker is that it has been determined that flicker exists, the flicker component is removed from the imaging output of the image sensor.

* * * * *